United States Patent
Nordstrom et al.

(10) Patent No.: US 9,297,304 B2
(45) Date of Patent: Mar. 29, 2016

(54) GAS TURBINE ENGINE SYSTEM WITH BLEED AIR POWERED AUXILIARY ENGINE

(75) Inventors: Carl David Nordstrom, Avon, IN (US); Ray F. Bowman, Carmel, IN (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 700 days.

(21) Appl. No.: 12/982,449

(22) Filed: Dec. 30, 2010

(65) Prior Publication Data

US 2011/0271687 A1    Nov. 10, 2011

Related U.S. Application Data

(60) Provisional application No. 61/291,200, filed on Dec. 30, 2009.

(51) Int. Cl.
| | |
|---|---|
| *F02C 6/08* | (2006.01) |
| *F02C 3/10* | (2006.01) |
| *F02C 3/14* | (2006.01) |

(52) U.S. Cl.
CPC ... *F02C 3/10* (2013.01); *F02C 3/14* (2013.01); *F02C 6/08* (2013.01)

(58) Field of Classification Search
CPC .............. F02C 3/10; F02C 3/113; F02C 6/08; F02C 9/18; F02C 9/42; F02C 6/02; F02C 7/32; F02C 7/36; F02C 3/107; F05B 2220/50
USPC .............................. 60/39.163, 782, 785, 79, 2
See application file for complete search history.

(56) References Cited

U.S. PATENT DOCUMENTS

| | | | |
|---|---|---|---|
| 2,612,020 A | | 9/1952 | Griffith |
| 3,901,026 A | * | 8/1975 | Quinn ............................ 60/792 |
| 4,819,423 A | * | 4/1989 | Vershure et al. ................ 60/778 |
| 5,285,626 A | | 2/1994 | Leeson |
| 5,309,707 A | * | 5/1994 | Provol et al. .................... 60/773 |
| 5,363,641 A | | 11/1994 | Dixon et al. |
| 5,694,765 A | | 12/1997 | Hield et al. |
| 5,722,229 A | | 3/1998 | Provost |
| 6,316,841 B1 | | 11/2001 | Weber |
| 6,796,527 B1 | | 9/2004 | Munoz et al. |
| 6,837,038 B2 | | 1/2005 | Eiler et al. |
| 6,865,891 B2 | | 3/2005 | Walsh et al. |
| 7,059,136 B2 | | 6/2006 | Coffinberry |
| 7,121,078 B2 | * | 10/2006 | Turco et al. ................... 60/39.15 |
| 7,980,052 B1 | * | 7/2011 | Paulino ..................... F02C 3/10 60/39.15 |
| 2003/0131585 A1 | * | 7/2003 | Saito et al. .................... 60/226.1 |
| 2004/0144096 A1 | * | 7/2004 | Wollenweber .................. 60/772 |
| 2005/0268612 A1 | | 12/2005 | Rolt |

(Continued)

OTHER PUBLICATIONS

International Search Report and Written Opinion, PCT/US2010/062562, Rolls-Royce North American Technologies, Inc.. Feb. 7, 2012.

*Primary Examiner* — William H Rodriguez
*Assistant Examiner* — Thomas Burke
(74) *Attorney, Agent, or Firm* — Barnes & Thornburg LLP

(57) ABSTRACT

One embodiment of the present invention is a unique gas turbine engine with a bleed air powered auxiliary engine. Other embodiments include apparatuses, systems, devices, hardware, methods, and combinations for bleed air powered auxiliary engines. Further embodiments, forms, features, aspects, benefits, and advantages of the present application shall become apparent from the description and figures provided herewith.

18 Claims, 1 Drawing Sheet

(56) References Cited

U.S. PATENT DOCUMENTS

| | | |
|---|---|---|
| 2006/0010875 A1 | 1/2006 | Mahoney et al. |
| 2006/0042227 A1 | 3/2006 | Coffinberry |
| 2006/0042270 A1* | 3/2006 | Thompson et al. ............. 60/802 |
| 2006/0225431 A1* | 10/2006 | Kupratis ......................... 60/791 |
| 2008/0060341 A1* | 3/2008 | Loisy ............................ 60/226.1 |
| 2008/0230651 A1 | 9/2008 | Porte |
| 2009/0064654 A1* | 3/2009 | Kirzhner et al. ............. 60/39.17 |
| 2012/0023954 A1* | 2/2012 | Wichmann ................ F02C 3/34 60/772 |

* cited by examiner

GAS TURBINE ENGINE SYSTEM WITH BLEED AIR POWERED AUXILIARY ENGINE

CROSS REFERENCE TO RELATED APPLICATIONS

The present application claims the benefit of U.S. Provisional Patent Application 61/291,200, filed Dec. 30, 2009, and is incorporated herein by reference.

FIELD OF THE INVENTION

The present invention relates to gas turbine engines, and more particularly, to an auxiliary engine powered by bleed air, e.g., from a gas turbine engine.

BACKGROUND

Gas turbine engine bleed air powered systems remain an area of interest. Some existing systems have various shortcomings, drawbacks, and disadvantages relative to certain applications. Accordingly, there remains a need for further contributions in this area of technology.

SUMMARY

One embodiment of the present invention is a unique gas turbine engine with a bleed air powered auxiliary engine. Other embodiments include apparatuses, systems, devices, hardware, methods, and combinations for bleed air powered auxiliary engines. Further embodiments, forms, features, aspects, benefits, and advantages of the present application shall become apparent from the description and figures provided herewith.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
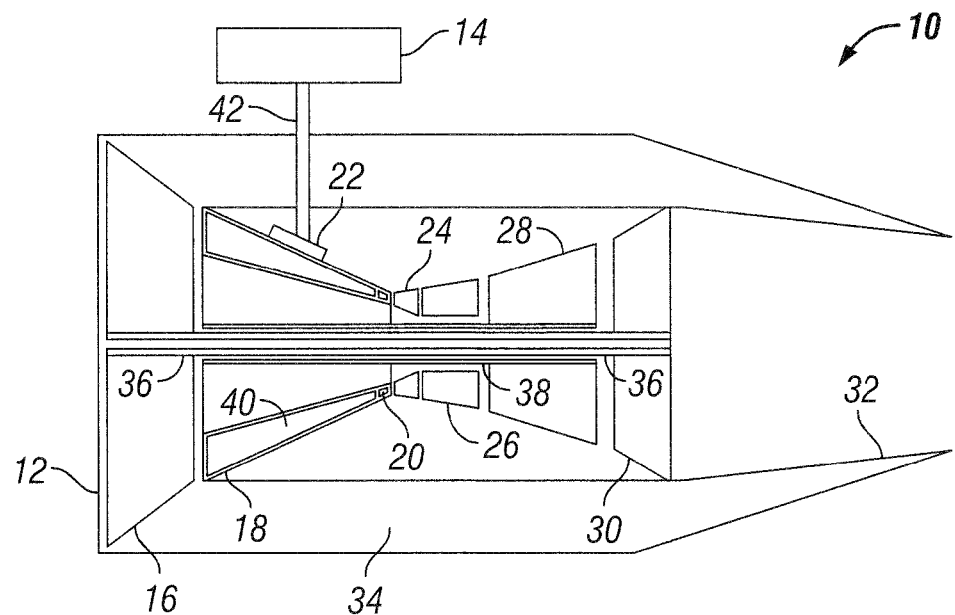
FIG. 1 schematically depicts a non-limiting example of a gas turbine engine having a bleed air power powered auxiliary engine in accordance with an embodiment of the present invention.

For purposes of promoting an understanding of the principles of the invention, reference will now be made to the embodiments illustrated in the drawings, and specific language will be used to describe the same. It will nonetheless be understood that no limitation of the scope of the invention is intended by the illustration and description of certain embodiments of the invention. In addition, any alterations and/or modifications of the illustrated and/or described embodiment(s) are contemplated as being within the scope of the present invention. Further, any other applications of the principles of the invention, as illustrated and/or described herein, as would normally occur to one skilled in the art to which the invention pertains, are contemplated as being within the scope of the present invention.

Referring now to the drawings, and in particular FIG. 1, a non-limiting example of a gas turbine engine system 10 in accordance with an embodiment of the present invention is schematically depicted. Gas turbine engine system 10 includes a gas turbine engine 12, which is an aircraft propulsion power plant. In one form, engine 12 is an axial flow turbofan engine. In other embodiments, engine 12 may be, for example, a turbojet engine, a turboprop engine, and/or a turboshaft engine having axial, centrifugal and/or axi-centrifugal flow compressors and/or turbines. In addition to aero gas turbine engines, embodiments of the present invention are applicable to marine gas turbine engines and land-based gas turbine engines.

In the illustrated embodiment, gas turbine engine system 10 also includes an auxiliary engine 14 that operates using bleed air extracted from gas turbine engine 12. In one form, gas turbine engine 12 is a two-spool engine. In other embodiments, engine 12 may have a greater or lesser number of spools, e.g., such as a single-spool engine or a three-spool engine. In one form, gas turbine engine 12 includes a fan 16, a compressor 18 with outlet guide vane (OGV) 20, a pressurized bleed air source 22, a diffuser 24, a combustor 26, a high pressure (HP) turbine 28, a low pressure (LP) turbine 30, an exhaust nozzle 32 and a bypass duct 34. Diffuser 24 and combustor 26 are fluidly disposed between OGV 20 of compressor 18 and HP turbine 28. LP turbine 30 is drivingly coupled to fan 16 via an LP shaft 36. HP turbine 28 is drivingly coupled to compressor 18 via an HP shaft 38. Compressor 18, HP shaft 38 and HP turbine 28 form, in part, an HP spool. Fan 16, LP shaft 36 and LP turbine 30 form, in part, an LP spool.

Compressor 18 includes a plurality of blades and vanes 40 for compressing air. During the operation of gas turbine engine 12, air is drawn into the inlet of fan 16 and pressurized by fan 16. Some of the air pressurized by fan 16 is directed into compressor 18 and the balance is directed into bypass duct 34. Bypass duct 34 directs the pressurized air to exhaust nozzle 32, which provides a component of the thrust output by gas turbine engine 12. Compressor 18 receives some of the pressurized air from fan 16, which is compressed by blades and vanes 40.

The pressurized air discharged from compressor 18 is directed downstream by OGV 20 to diffuser 24, which diffuses the airflow, reducing its velocity and increasing its static pressure. The diffused airflow is directed into combustor 26. Fuel is mixed with the pressurized air in combustor 26, which is then combusted in a combustion liner (not shown). The hot gases exiting combustor 26 are directed into HP turbine 28, which extracts power from the hot gases in the form of mechanical shaft power to drive compressor 18 via HP shaft 38. The hot gases exiting HP turbine 28 are directed into LP turbine 30, which extracts power from the hot gases in the form of mechanical shaft power to drive fan 16 via LP shaft 36. The hot gases exiting LP turbine 30 are directed into nozzle 32, and provide a component of the thrust output by gas turbine engine 12.

In one form, pressurized bleed air source 22 is a compressor bleed. Compressor bleed 22 is in fluid communication with compressor 18, and is operative to bleed pressurized air from compressor 18. In one form, compressor bleed 22 bleeds interstage air from compressor 18, e.g., from one or more stages of blades and vanes 40. In another form, compressor bleed 22 bleeds air discharged from compressor 18, e.g., in addition to or in place of interstage air. In other embodiments, pressurized bleed air source 22 may be any source of pressurized air, for example and without limitation, motor and/or engine driven pumps and/or compressors, and/or other pressurized air sources, such as compressed air storage tanks and/or other compressed air systems/facilities. Auxiliary engine 14 is a turbine engine system in fluid communication with bleed air source 22 22 via ducting 42. Ducting 42 supplies the pressurized air bled from compressor 18 to auxiliary engine 14. In other embodiments, it is contemplated that auxiliary engine 14 may be coupled directly to bleed air source 22 without intervening ducting 42.

Figure 2:
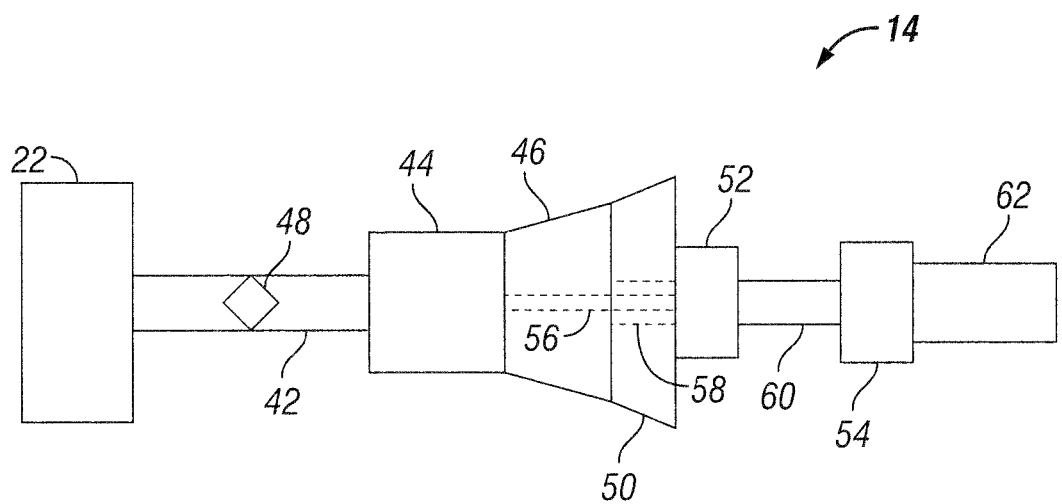
FIG. 2 schematically depicts a non-limiting example of the auxiliary engine of FIG. 1.

Referring now to FIG. 2, auxiliary engine 14 in a non-limiting exemplary elemental form includes a combustor 44 and a turbine 46. Other embodiments may include additional components. Combustor 44 is in fluid communication with ducting 42. Turbine 46 is in fluid communication with combustor 44. In one form, turbine 46 is a two-stage turbine, although turbines having a greater or lesser number of stages may alternatively be employed. A valve 48, such as a fast-acting air valve, controls the flow of bleed air into combustor 44. In one form, valve 48 is configured to operate between a fully closed position and a fully open position in order to modulate the flow of bleed air into combustor 44 to a desired level, e.g., in response to a control input based on a desired output of auxiliary engine 14. In other embodiments, valve 48 may be an on/off valve, or any valve operable between a maximum flow condition and a minimum flow condition. In one form, combustor 44 includes a plurality of fuel injectors (not shown), which add fuel to the pressurized air received from ducting 42, which is ignited in combustor 44, e.g., in a combustion liner (not shown). In other embodiments, only a single fuel injector may be employed. The resultant hot gas stream is expanded in turbine 46, which extracts power from the hot gases in the form of mechanical shaft power.

In one form, auxiliary engine 14 also includes a turbine 50, e.g., downstream of turbine 46, a gearbox 52 and a reduction gearbox 54. In one form, turbine 50 is on a different spool than turbine 46, i.e., supported by bearings that allow rotation independent of turbine 46. In other embodiments, auxiliary engine 14 may not include another turbine, such as turbine 50, and/or may not include one or both of gearbox 52 and a reduction gearbox 54. Turbine 50 extracts additional power from the hot gas stream. Turbine 46 is coupled to gearbox 52 via a shaft 56. In one form, turbine 50 is a two-stage turbine, although turbines having a greater or lesser number of stages may be employed in other embodiments. Turbine 50 is coupled to gearbox 52 via a shaft 58. In one form, gearbox 52 maintains a constant speed ratio between turbine 46 and turbine 50. In other embodiments, gearbox 52 may control a speed ratio between turbine 46 and turbine 50 that may be constant or may be variable. Gearbox 52 is coupled to reduction gearbox 54 via a shaft 60, and provides the combined power output from turbine 46 and turbine 50 to reduction gearbox 54. In one form, a generator 62 is coupled to the output of reduction gearbox 54.

Auxiliary engine 14 produces power from bleed air received from aircraft or ground based air producing machinery, such as gas turbine engines, motor and/or engine driven pumps and/or compressors, and/or other pressurized air sources, such as compressed air storage tanks and/or other compressed air systems/facilities. Compressed air introduced into and mixed with fuel combusted in combustor 44 provides energy to power one or more turbines, e.g., turbine 46 and turbine 50, which may be used to operate machinery, such as generator 62. Bleed air is traditionally available in aircraft and some ground and seaborne applications. In other embodiments, other machines and/or devices may be powered by auxiliary engine 14 in addition to or in place of generator 62.

In various forms, auxiliary engine 14 may include an air duct inlet that is connected to the pressurized air source and sized appropriately for the flow and temperature and a fast-acting air valve to admit and modulate bleed air flow. The duct may be connected to a combustion casing that contains a combustor similar to normal gas turbine engine combustors, one or more fuel nozzles to provide fuel to the combustor to burn the air/fuel mixture, a single or multi-stage, single or multi-spool turbine section, an exhaust, and where desired, may also include a reduction gearbox that provides power output. When a multi-spool turbine is employed, the auxiliary engine may employ a gearbox that maintains a constant speed ratio between the various spools while providing a single or multiple output speed. Alternatively, when multiple spools are employed, power may be absorbed directly, e.g., from each spool, with turbine speed control from the power input device.

In the case of aircraft, substantial high pressure bleed air is available in cruise flight, since aircraft are designed to fly with one engine out. At least two bleed flow levels are envisioned; e.g., one for idle/warmup, and the other for full power operation. Part power operation could also be achieved through duct air valve modulation. A control system may be employed to control operation from stop to idle, accelerating from idle to part or full power, and from full or part power to idle, e.g., to prevent flame stability or turbine integrity issues. It is also envisioned that an auxiliary engine such as auxiliary engine 14 may operate at constant speed from idle to full power to improve system response time, or variable speed if the application requirements demand variable speed input.

In one aspect the present application provides a novel way to extract large amounts of power from a small package. For example, some models of the Rolls-Royce Model 250 C30 gas turbine engine produce approximately 650 HP, which is produced from the energy remaining from the high pressure core compressor and turbine, by the engine's low pressure turbine. The compressor of the C30 engine requires in the range of 1200 HP to run, that is, the high pressure turbine produces 1200 HP to power the compressor. Embodiments of the present invention may make it possible to use the power from the high pressure turbine for power output from the auxiliary engine, so that the total power output of the machine is approximately 1850 HP. Embodiments of the present invention may provide a novel way to provide high power density, modular power for applications such as megawatt power generators or pumping where space limitations exist. Power outputs on the order of 10 HP per pound are achievable with this approach, providing instant power on demand. This present application provides an additional power source for high altitude operation of a gas turbine powered application where very low Reynolds Number values make a traditional auxiliary power unit (APU) impractical. The large gas turbine compressor, which is the bleed source for the pressurized air employed by the auxiliary engine, is less subject to the impact of low Reynolds Number operation, and operates with improved stability due to the bleed offtake.

As one example, a system can be obtained by using a stock Rolls-Royce Model 250 C30 turbine, combustor and combustor casing, fuel nozzle and exhaust assembly mated to a reduction gearbox that mechanically maintains a constant speed ratio between the high pressure and low pressure turbines of the C30 while providing a single output speed, all fed by an external bleed air source. This design features a high pressure turbine and a low pressure turbine. In one form, a bleed source of 5 lbs/sec at 8 atmospheres may be employed, although higher or lower pressures and/or flows may be employed in other embodiments. The air duct/duct air valve may interface with the existing C30 combustor casing.

As another example, an air duct leading to a combustor that feeds into a single spool turbine and exhaust may be employed, all fed by an external bleed air source. The single spool turbine can either directly drive a generator or other powered device such as a pump, or can drive a gearbox that in turn drives either a generator or other powered device such as a pump.

Embodiments of the present invention include a gas turbine engine system, including a compressor; a first combustor in fluid communication with the compressor; a second combustor in fluid communication with the compressor in parallel with the first combustor; a first turbine in fluid communication with the first combustor; and a second turbine in fluid communication with the second combustor.

In a refinement, the gas turbine engine system further includes a bleed system in fluid communication with the compressor, wherein the second combustor is in fluid communication with the compressor via the bleed system. In another refinement, the second combustor is in fluid communication with the compressor in parallel with the first combustor.

In another refinement, the gas turbine engine system further includes a duct fluidly coupling the second combustor with the compressor.

In yet another refinement, the gas turbine engine system further includes a reduction gearbox coupled to the second turbine.

In still another refinement, the gas turbine engine system further includes a third turbine in fluid communication with the second combustor, wherein the third turbine is on a different spool than the second turbine. In a further refinement, the third turbine is downstream of the second turbine. In another refinement, a gearbox is coupled to both the second turbine and the third turbine, wherein the gearbox is structured to maintain a constant speed ratio between the second turbine and the third turbine. In yet another refinement, a reduction gearbox is coupled to at least one of the second turbine and the third turbine. In still another refinement, the reduction gearbox is coupled to both the second turbine and the third turbine.

In yet still another refinement, the gas turbine engine system further includes a valve structured to control the flow of bleed air into the second combustor. In a further refinement, the valve is a fast-acting air valve.

Embodiments of the present invention include a turbine engine system, comprising: a pressurized bleed air source; a combustor in fluid communication with the pressurized bleed air source; a valve disposed between the pressurized bleed air source and the combustor, wherein the valve is configured to control a flow of pressurized air from the pressurized bleed air source into the combustor; and a first turbine in fluid communication with the combustor.

In a refinement, the pressurized bleed air source is a compressor bleed from a compressor of a gas turbine engine.

In another refinement, the turbine engine system further comprises a second turbine in fluid communication with the first turbine.

In yet another refinement, the turbine engine system further comprises a gearbox coupled to both the first turbine and the second turbine, wherein the gearbox is structured to control a speed ratio between the first turbine and the second turbine.

In still another refinement, the first turbine and the second turbine are configured to supply power to a machine.

In yet still another refinement, the turbine engine system further comprises a reduction gearbox is coupled to both the first turbine and the second turbine.

In a further refinement, the turbine engine system is configured to supply power to a machine.

Embodiments of the present invention include a turbine engine system, comprising: means for providing pressurized air; a valve in fluid communication with the means for providing pressurized air, wherein the valve is configured to control a flow of pressurized air from the means for providing pressurized air; a combustor in fluid communication with the valve; and a turbine in fluid communication with the combustor.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A gas turbine engine system, comprising:
   a compressor forming a source of pressurized air;
   a first combustor in fluid communication with said compressor and configured to receive working fluid consisting of pressurized air directly from the compressor prior to the working fluid passing through a heat addition component or an expansion component;
   a second combustor in fluid communication with said compressor in parallel with said first combustor and configured to receive working fluid consisting of pressurized air directly from the compressor prior to the working fluid passing through a heat addition component or an expansion component;
   a first turbine in fluid communication with and downstream of said first combustor;
   a second turbine in fluid communication with said second combustor; and
   a third turbine in fluid communication with said second combustor, wherein said third turbine is on a different spool than said second turbine;
   wherein the second combustor, the second turbine, and the third turbine are configured as an auxiliary engine, wherein the auxiliary engine does not include a compressor.

2. The gas turbine engine system of claim 1, further comprising a bleed system in fluid communication with said compressor, wherein said second combustor is in fluid communication with said compressor via said bleed system.

3. The gas turbine engine system of claim 1, further comprising a duct fluidly coupling said second combustor with said compressor.

4. The gas turbine engine system of claim 1, further comprising a reduction gearbox coupled to said second turbine.

5. The gas turbine engine system of claim 1, wherein said third turbine is downstream of said second turbine.

6. The gas turbine engine system of claim 1, further comprising a gearbox coupled to both said second turbine and said third turbine, wherein said gearbox is structured to maintain a constant speed ratio between said second turbine and said third turbine.

7. The gas turbine engine system of claim 1, further comprising a reduction gearbox coupled to at least one of said second turbine and said third turbine.

8. The gas turbine engine system of claim 7, wherein said reduction gearbox is coupled to both said second turbine and said third turbine.

9. The gas turbine engine system of claim 1, further comprising a valve structured to control the flow of bleed air into said second combustor.

10. The gas turbine engine system of claim 9, wherein said valve is a fast-acting air valve.

11. A turbine system configured to operate using pressurized air from a pressurized bleed air source associated with another turbine engine system, comprising:
- a combustor in fluid communication with the pressurized bleed air source and configured to receive working fluid consisting of the pressurized air directly from the pressurized bleed air source prior to the working fluid passing through a heat addition component or an expansion component;
- a valve disposed between the pressurized bleed air source and the combustor, wherein the valve is configured to control a flow of pressurized air from the pressurized bleed air source into the combustor;
- a first turbine in fluid communication with the combustor;
- a second turbine in fluid communication with the first turbine;
- a primary combustor in fluid communication with the pressurized bleed air source in parallel with the combustor, the primary combustor configured to receive working fluid consisting of pressurized air directly from the pressurized bleed source prior to the working fluid passing through a heat addition component or an expansion component; and
- a primary turbine in fluid communication with the primary combustor and directly downstream of the primary combustor;

wherein the combustor, the first turbine, and the second turbine are configured as an auxiliary engine, wherein the auxiliary engine does not include a compressor.

12. The turbine engine system of claim 11, wherein the pressurized bleed air source is a compressor bleed from a compressor of a gas turbine engine.

13. The turbine engine system of claim 11, further comprising a gearbox coupled to both the first turbine and the second turbine, wherein the gearbox is structured to control a speed ratio between the first turbine and the second turbine.

14. The turbine engine system of claim 11, wherein the first turbine and the second turbine are configured to supply power to a machine.

15. The turbine engine system of claim 11, further comprising a reduction gearbox is coupled to both the first turbine and the second turbine.

16. The turbine engine system of claim 11, wherein at least one of the first and second turbines are connected to an electrical generator configured to supply power to a machine.

17. The gas turbine engine system of claim 1, wherein power generation components of the auxiliary engine consist of the second combustor, the second turbine, and the third turbine.

18. The gas turbine engine system of claim 11, wherein power generation components of the auxiliary engine consist of the combustor, the first turbine, and the second turbine.

* * * * *